(12) United States Patent
Jager

(10) Patent No.: US 7,640,894 B2
(45) Date of Patent: Jan. 5, 2010

(54) TREAT DISPENSER FOR ANIMALS

(75) Inventor: Claudius Jager, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 0 days.

(21) Appl. No.: 11/455,613

(22) Filed: Jun. 19, 2006

(65) Prior Publication Data

US 2007/0289553 A1 Dec. 20, 2007

(51) Int. Cl.
*A01K 15/02* (2006.01)
*A01K 29/00* (2006.01)
(52) U.S. Cl. .................................. 119/710; D30/160
(58) Field of Classification Search ......... 119/707–711, 119/702; D20/7; D30/160; 446/168
See application file for complete search history.

(56) References Cited

U.S. PATENT DOCUMENTS

| | | | | |
|---|---|---|---|---|
| 1,150,761 A * | 8/1915 | Hartman | ..................... | 273/112 |
| 1,963,054 A * | 6/1934 | Powers | ........................... | 5/256 |
| 2,718,873 A * | 9/1955 | Buckner | ..................... | 119/711 |
| 2,752,725 A * | 7/1956 | Unsworth | ................... | 446/166 |
| D181,358 S * | 11/1957 | Johnson | ..................... | D11/121 |
| 3,028,704 A * | 4/1962 | Rumbaugh | .................. | 446/168 |
| 3,135,512 A * | 6/1964 | Taylor | ......................... | 273/109 |
| D234,790 S * | 4/1975 | Rosenberg | ................. | D30/160 |
| 4,720,283 A * | 1/1988 | Williams et al. | .............. | 446/69 |
| RE34,352 E * | 8/1993 | Markham et al. | ........... | 119/710 |
| D353,235 S * | 12/1994 | D'Angelico | ............... | D30/160 |
| D379,137 S * | 5/1997 | Lam | ............................ | D7/589 |
| 5,758,604 A * | 6/1998 | Jørgensen | .................... | 119/711 |
| D407,868 S * | 4/1999 | Axelrod | ...................... | D30/160 |
| 6,073,581 A * | 6/2000 | Wang | ....................... | 119/51.01 |
| 6,148,771 A * | 11/2000 | Costello | ..................... | 119/709 |
| 6,439,166 B1 * | 8/2002 | Markham | .................... | 119/710 |
| 6,485,349 B1 * | 11/2002 | Snyder et al. | ............... | 446/168 |
| 6,557,496 B2 * | 5/2003 | Herrenbruck | ............... | 119/707 |
| 6,599,164 B1 * | 7/2003 | Gerwitz et al. | .............. | 446/168 |
| 6,601,538 B1 * | 8/2003 | Viola | ......................... | 119/709 |
| 6,619,962 B1 * | 9/2003 | Gubitosi et al. | ............. | 434/258 |
| 6,626,302 B2 * | 9/2003 | Barrett et al. | .............. | 211/59.2 |
| D499,146 S * | 11/2004 | Liu et al. | ....................... | D20/7 |
| D508,592 S * | 8/2005 | Winkler | ..................... | D30/160 |
| D523,191 S * | 6/2006 | Wang | ........................ | D30/160 |
| 7,506,613 B2 * | 3/2009 | Wolfe et al. | ................. | 119/709 |
| 2007/0022971 A1 * | 2/2007 | Renforth et al. | ............. | 119/707 |

* cited by examiner

*Primary Examiner*—Rob Swiatek
*Assistant Examiner*—Kristen C Hayes
(74) *Attorney, Agent, or Firm*—Robert W. Becker; Robert W. Becker & Assoc.

(57) ABSTRACT

A treat dispenser for animals, especially in the form of a rubber chew toy for dogs. The treat dispenser comprises a housing having a hollow interior and at least one aperture adapted to receive and dispense treats. The treat dispenser also has an at least partially helically extending insert disposed in the hollow interior of the housing and adapted to advance treats to the at least one aperture of the housing.

12 Claims, 9 Drawing Sheets

TREAT DISPENSER FOR ANIMALS

BACKGROUND OF THE INVENTION

The present invention relates to a treat dispenser for animals, especially in the form of a rubber chew toy for dogs.

SUMMARY OF THE INVENTION

The treat dispenser of the present application comprises a housing having a hollow interior, wherein the housing has at least one aperture that is adapted to receive and dispense treats; the treat dispenser also comprises an at least partially helically extending insert that is disposed in the hollow interior of the housing and is adapted to advance treats to the at least one aperture of the housing.

Further specific features of the invention will be described in detail subsequently.

BRIEF DESCRIPTION OF THE DRAWINGS

Several embodiments of the treat dispenser of the present application are illustrated in the drawings, which are presented by way of example only, and in which.

DESCRIPTION OF SPECIFIC EMBODIMENTS

Figure 1:
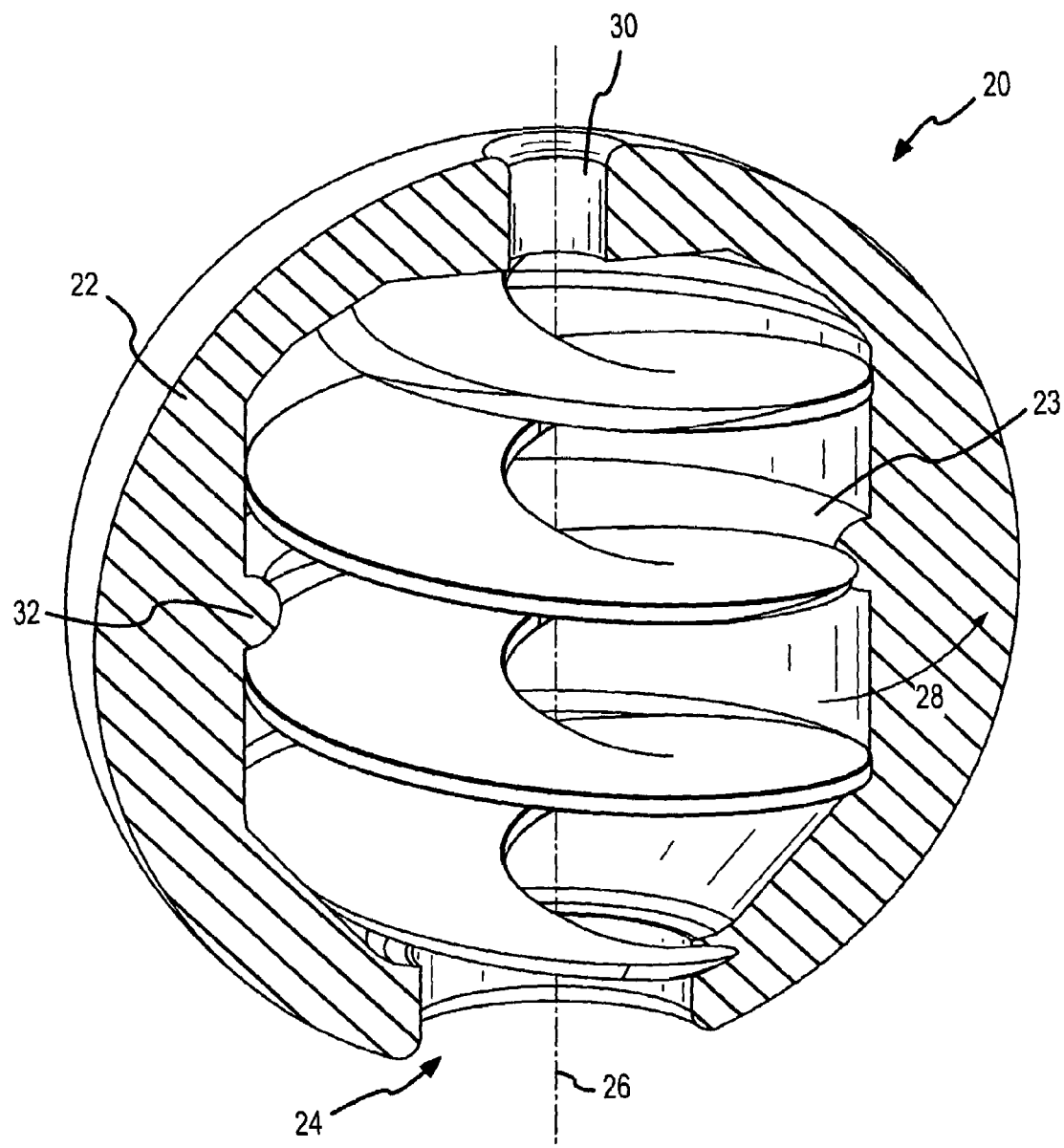
FIG. 1 shows an exemplary embodiment of a treat dispenser of the present application.

Referring now to the drawings in detail, FIG. 1 shows one possible embodiment of a treat dispenser for animals pursuant to the present application, with the treat dispenser being designated generally by the reference numeral 20. The treat dispenser of the present application comprises a hollow housing 22, and an insert 23 that is disposed in the housing 22. The housing is in particular in the nature of a chew toy for dogs, and can be made of elastomeric material that is strong and tough enough to withstand the rough play of an animal. Suitable elastomeric materials could include natural rubber or a thermoset rubber, for example SBR rubber having a Shore A hardness of 35-85.

The hollow housing 22 is provided with an aperture 24 that is adapted to receive treats into the hollow interior of the housing, and to dispense treats therefrom. It should be noted that the aperture 24 is not intended to hold treats in place, but rather to allow them to pass into and out of the housing 22. The aperture 24 also enables introduction of the insert 23 into the interior of the housing 22 when the insert is a separate component. In particular, the housing can be stretched by up to 300%, whereupon the insert 23 can easily be introduced through the aperture 24 into the interior of the housing 22. Although only one aperture 24 is shown, it would also be possible to provide more than one aperture.

Figure 3:
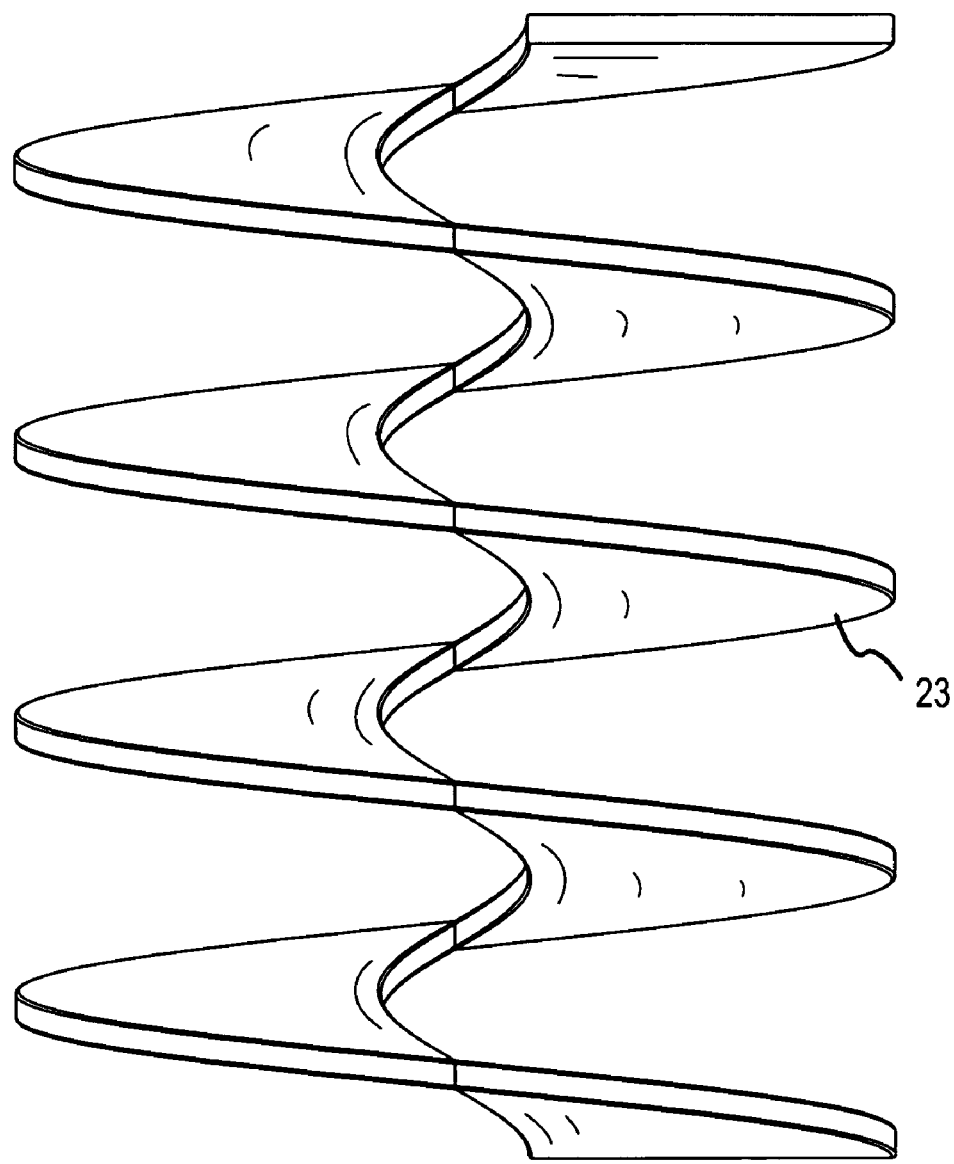
FIG. 3 shows the insert of the treat dispenser of FIG. 1.

The insert 23 serves for advancing treats toward or away from the aperture 24, depending upon the direction in which the treat dispenser rotates, as will be discussed in detail subsequently. In the embodiment illustrated in FIG. 1, the insert 23 is in the form of a true helix, as can be seen more clearly in FIG. 3, which shows the insert 23 by itself. The insert 23 can be made, for example, of a polyamide resin, such as nylon, ABS resins, elastomeric material, thermoplastic material, composites, etc.

Although in FIG. 1 the insert 23 is shown as conforming somewhat to the inner contour of the housing 22, this is not absolutely necessary, so that the insert 23 could be disposed somewhat loosely in the housing 22, which would make the housing more flexible. The important thing is that the insert 23 not be able to tilt to any significant amount, for example not more than 30°, in a direction transverse to the longitudinal axis 26 of the insert 23. In this connection, the height to width ratio of the insert is preferably greater than 1. However, the insert 23 need not be prevented from rotating about the axis 26.

The insert 23 essentially operates on the principle of an Archimedes or endless screw, wherein upon rotation of the insert 23, either on its own or together with the housing 22, treats or other material contained in the housing would travel along the broad threads of the insert 23 in one direction or the other. For example, if the toy or treat dispenser 20 illustrated in FIG. 1 is rolled in a direction having a first directional component indicated by the arrow 28 that is perpendicular to the central axis 26 of the insert 23, treats contained within the housing 22 will move along the threads of the insert 23 in a direction toward the aperture 24, where they can be dispensed, in particular one at a time. However, if the toy is rolled in a direction having a directional component that is opposite to that indicated by the arrow 28, then the treats will move along the threads of the insert 23 in a direction away from the aperture 24.

Figure 2:
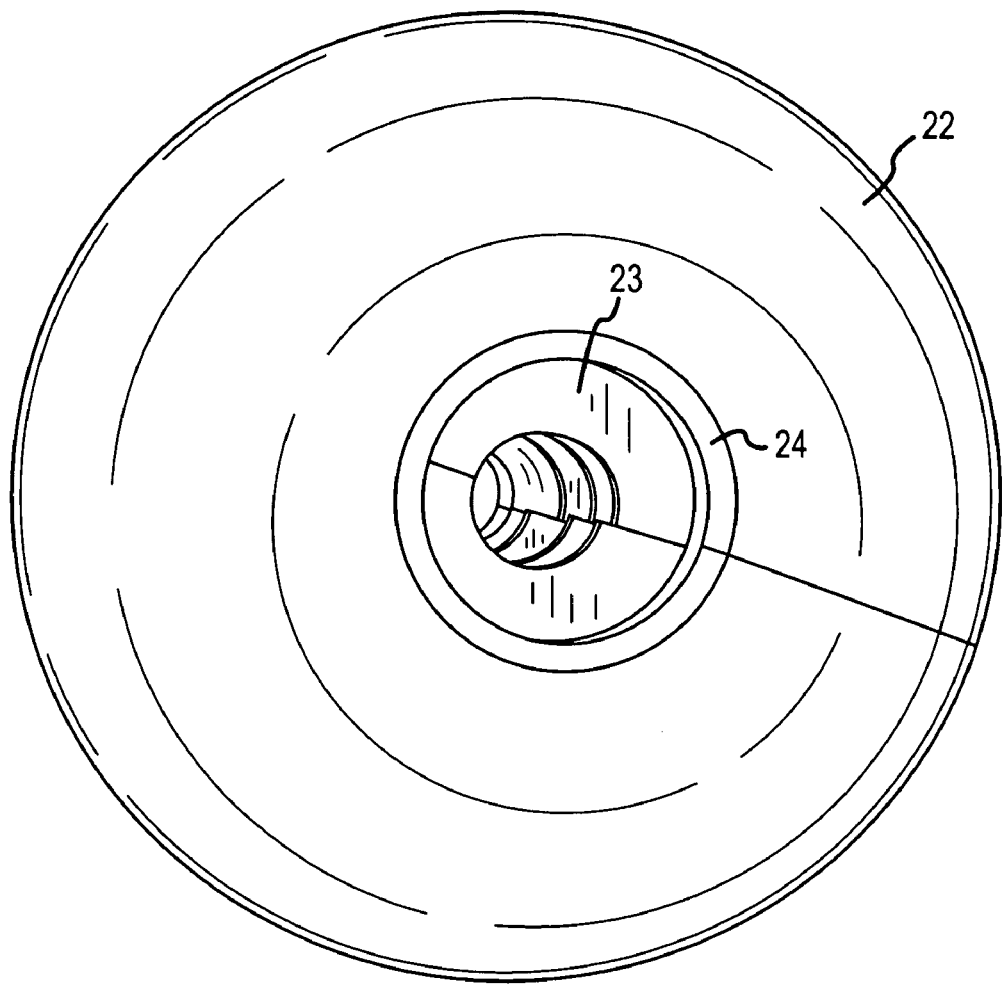
FIG. 2 is a view into the treat dispenser of FIG. 1 from one end thereof.

Although the insert 23 has been illustrated as forming a circular or conically open central portion when viewed from one end, for example from the direction of the aperture 24 as shown in FIG. 2, by appropriately shaping the inner surfaces of the threads of the insert 23, the central portion could also be open only partially, or not be open at all, again when viewed from one end. In other words, when viewed in the direction of the central axis 26, the inner surfaces could be spaced by any desired distance from the axis 26. It should also be noted that where an open central portion is provided, the opening thereof is generally small enough to prevent treats from dropping straight through when the treat dispenser is disposed in such a way that the insert 23 is vertically oriented. Furthermore, the open central cross-section of the insert 23 is symmetrical or assymetrical relative to the central longitudinal axis 26 of the insert 23.

The metering or dispensing rate of treats from the treat dispenser 20, i.e. from the aperture 24 of the housing 22, can be affected in several different ways. For example, the number of flights or threads of the insert 23 can vary (by way of example, compare FIGS. 4 and 5). In addition, the pitch of the threads can vary from one end of the insert 23 to the other. For example, the angle of the threads can become smaller or flatter in the direction toward the aperture 24, which would cause the treats to back up somewhat within the housing 22. The size of the open central portion of the insert 23 can also be varied. The size of the treats inserted into the interior of the housing 22 will also affect the feed or dispensing rate thereof. It is generally desirable that the treats not be dispensed too rapidly, although at a rate that is sufficient to hold the interest of an animal playing with the treat dispenser 20.

In the embodiment illustrated in FIG. 1, the housing 22 is also provided with a breathing hole 30 that is disposed diametrically opposite from the location of the aperture 24. Thus, if an animal has its mouth entirely over either the aperture 24 or the hole 30, the animal can still breathe due to the presence of the other hole or aperture that is not covered. It should be noted that the additional, optional breathing hole 30 is of a size such that it cannot receive nor dispense treats.

As also shown in FIG. 1, the housing 22 can be provided with an optional, reinforcing rib 32.

Figure 4:
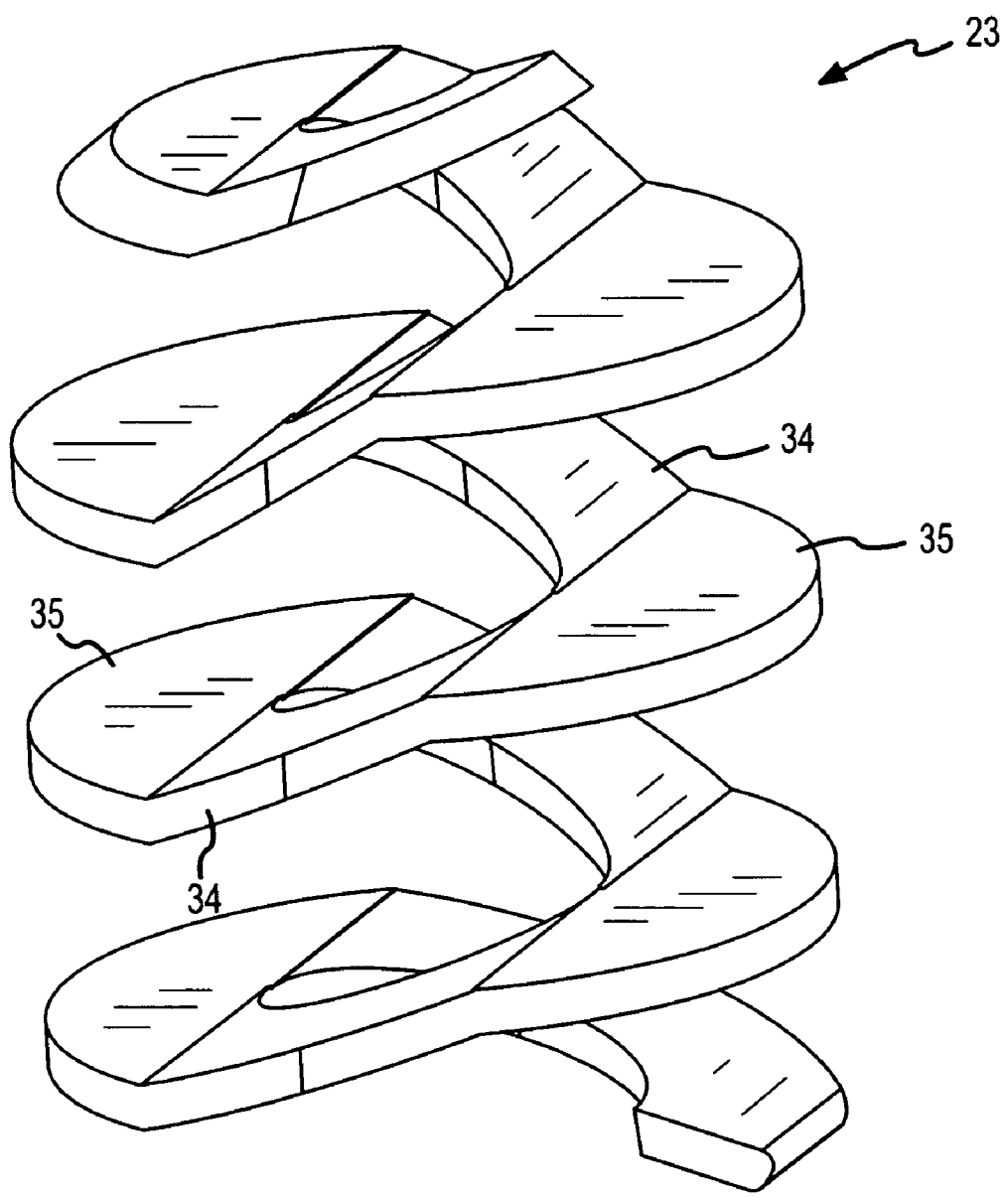
FIG. 4 shows an exemplary embodiment of another insert for a treat dispenser of the present application.

FIG. 4 illustrates another exemplary embodiment of an insert 23 for the treat dispenser 20 of the present application. In this embodiment, the insert 23 is characterized as having a stairstepped design or configuration, thus deviating from a true helix. In particular, the insert 23 of FIG. 4 has inclined sections 34 that lead to or from platform sections 35, which serve to divide the interior of the housing 22 into multiple chambers for the temporary retention of treats or other material. The platform sections 35 also serve to retard the dispensing or release rate of treats from the interior of the housing 22.

Figure 5:
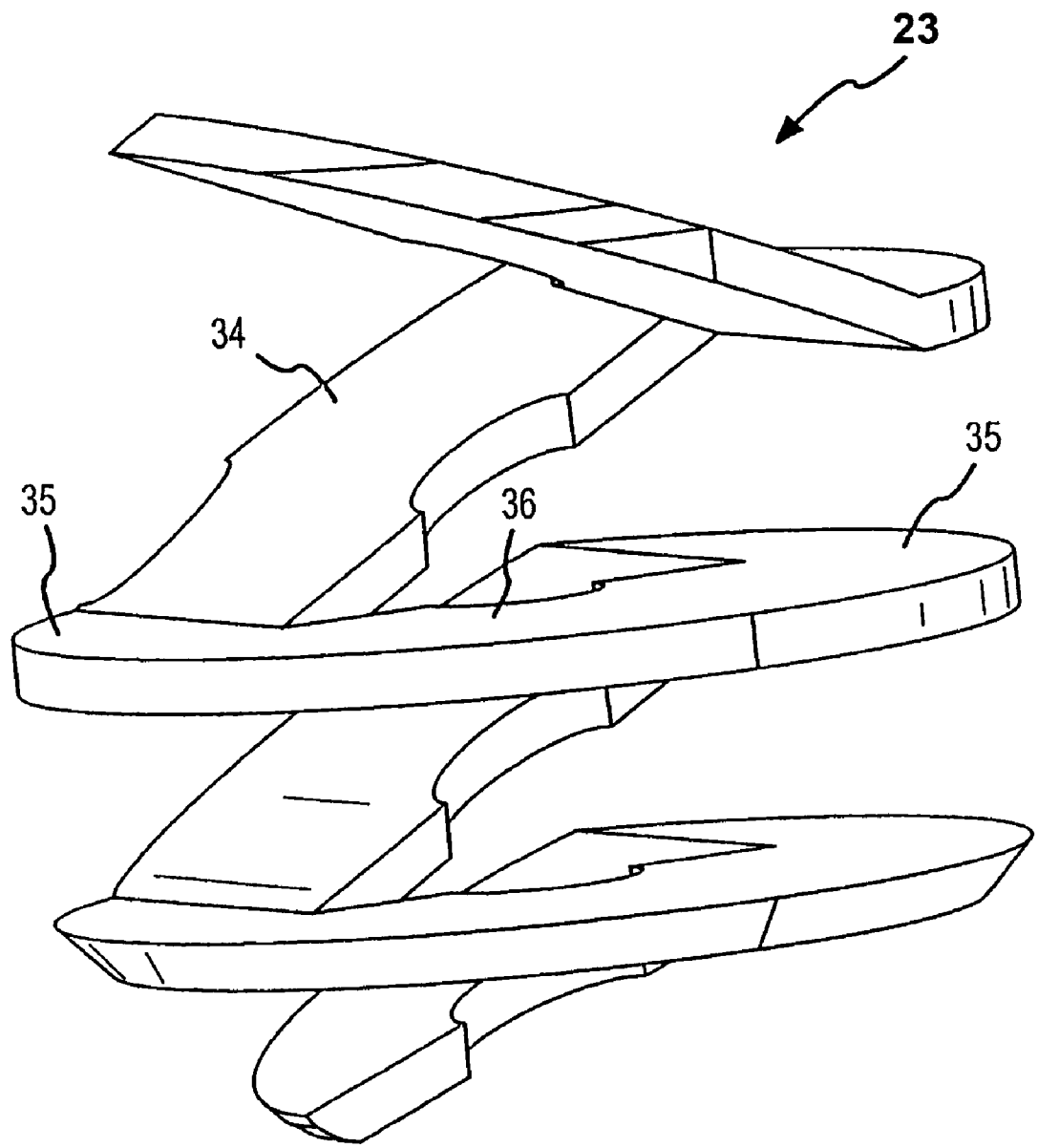
FIG. 5 shows a modified embodiment of the insert of FIG. 4.
Figure 7:
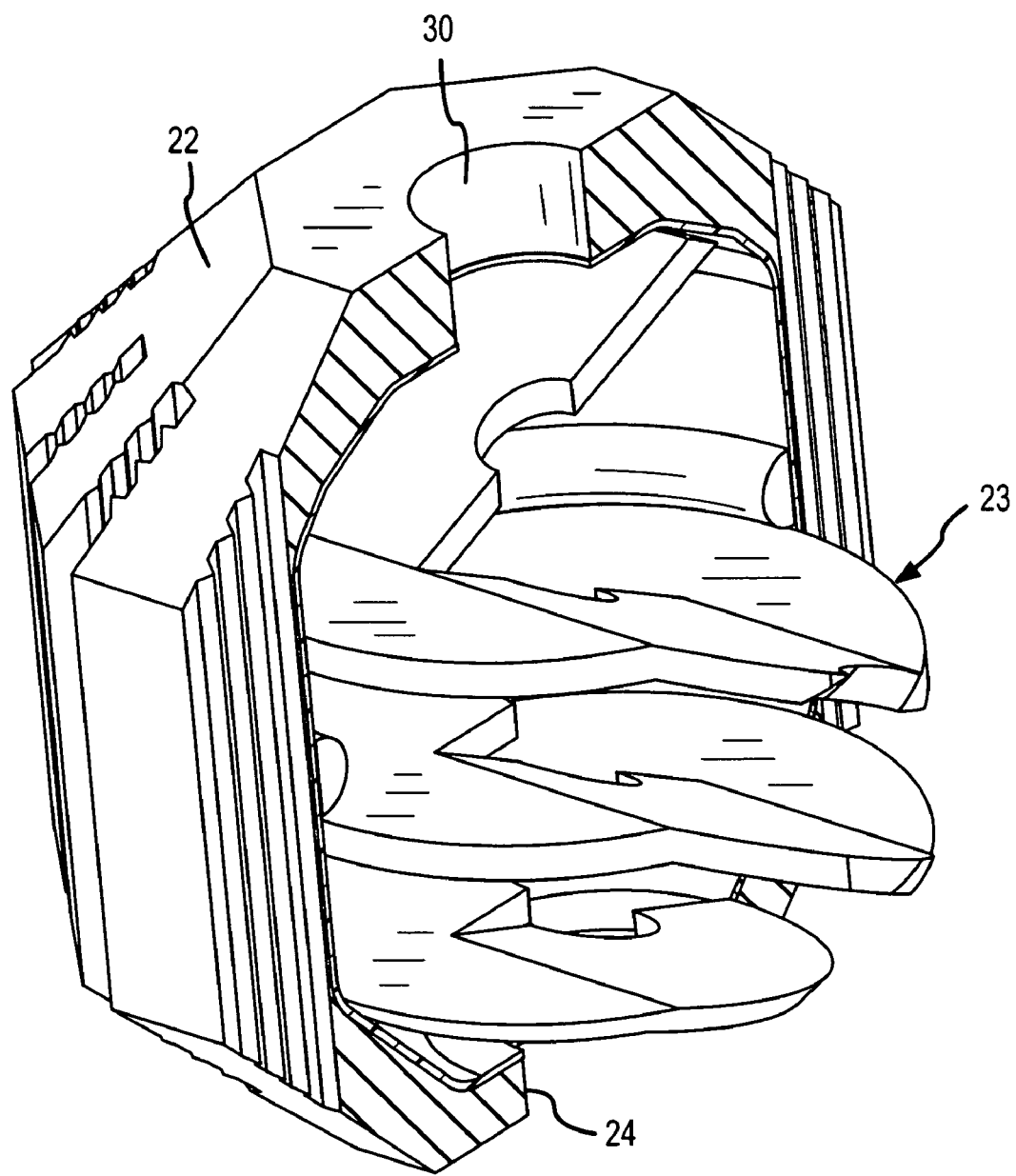
FIG. 7 shows another exemplary embodiment of a treat dispenser of the present application.

In the embodiment of the insert 23 illustrated in FIG. 5, not only do the number of flights or threads of the insert differ from the embodiment illustrated in FIG. 4, but in addition rather than the portions that are disposed between the platform sections 35 always being inclined relative to the platform sections, some of the platform sections 35 can be interconnected by a thread portion 36 that is disposed in the same plane as are the two platform sections 35 that are interconnected (see also the embodiment of FIG. 7).

Figure 6:
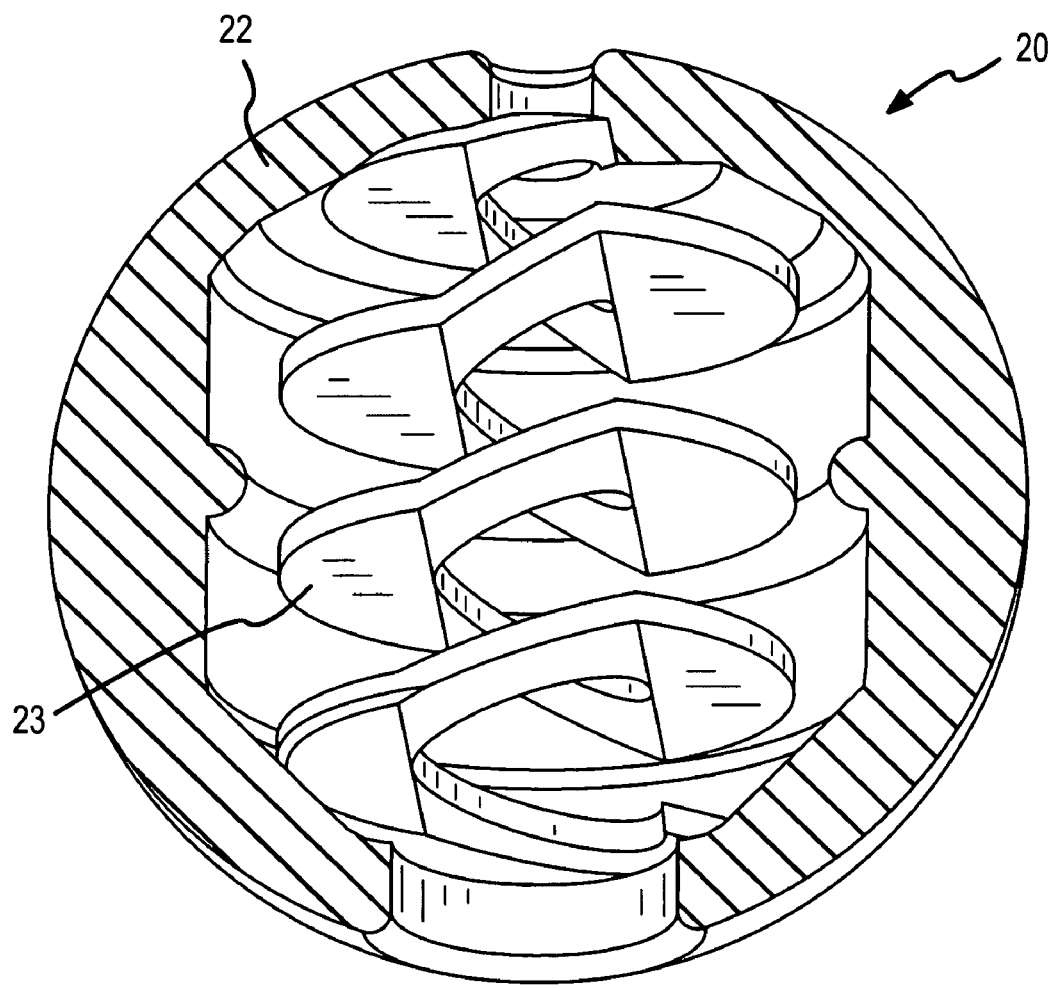
FIG. 6 shows a treat dispenser containing a further modified insert.

Some of the many possible variations for the designs of the inserts 23 are shown in FIGS. 6-9. For example, FIG. 6 shows another exemplary embodiment of a treat dispenser 20 having a modified insert 23 disposed in the housing 22.

FIG. 7 shows one of many different configurations that are possible for the housing 22, as well as a modified insert 23 having an open central portion with a circular cross-section when viewed from either the aperture 24 or the hole 30.

Figure 8:
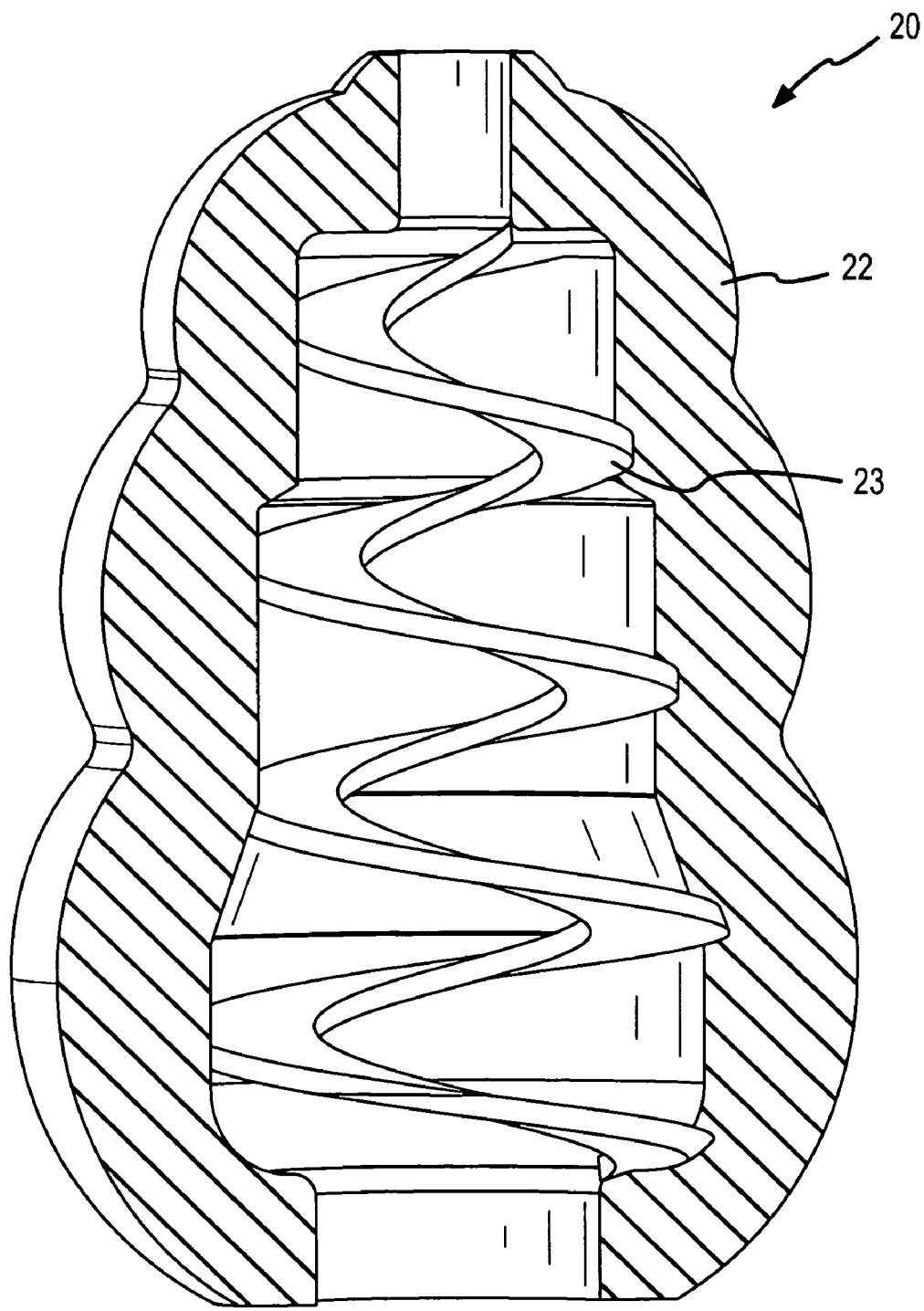
FIG. 8 shows another exemplary embodiment of the treat dispenser of the present application.
Figure 9:
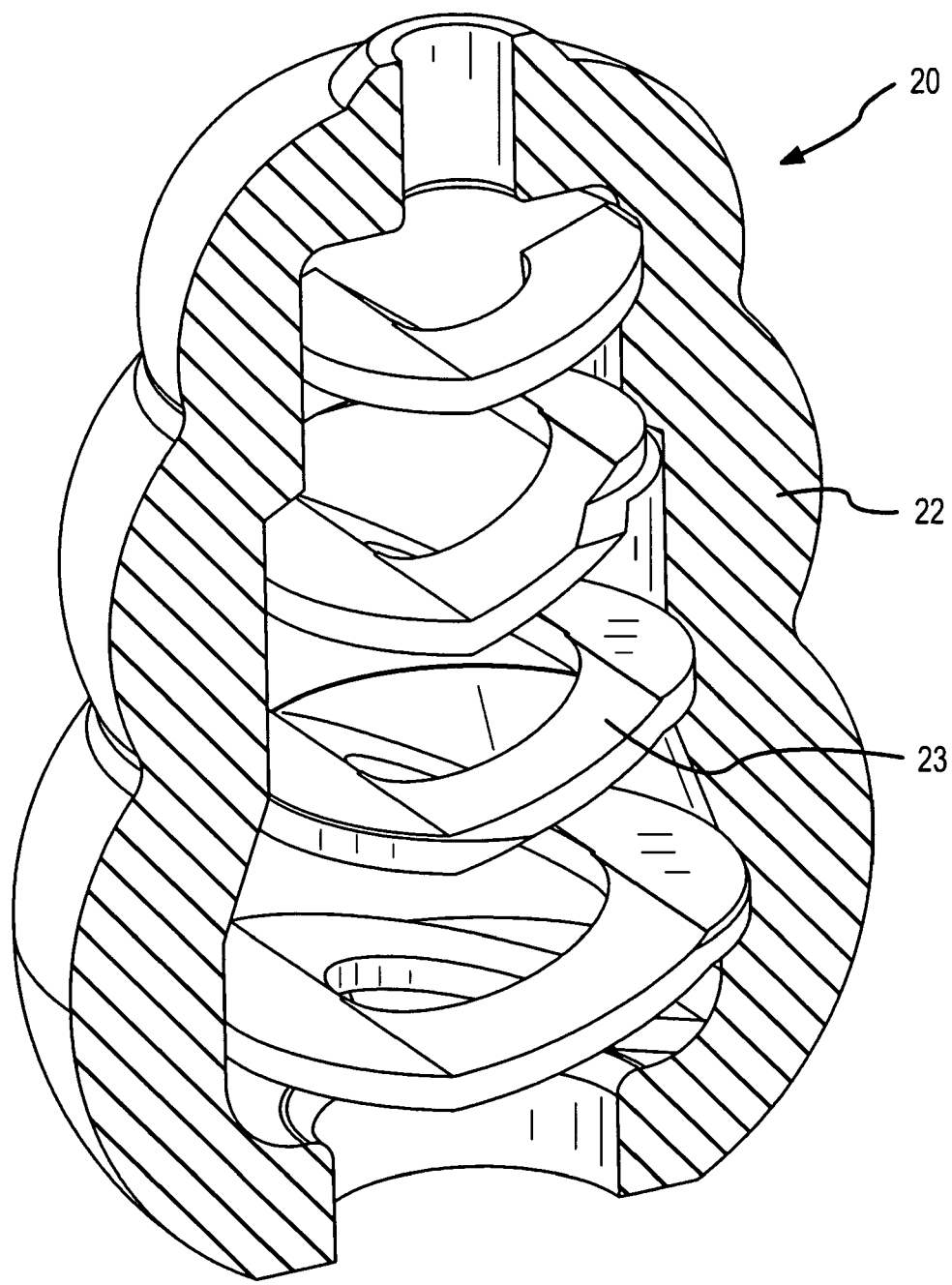
FIG. 9 shows another exemplary embodiment of a treat dispenser of the present application.

FIGS. 8 and 9 show another configuration for the housing 22, one time with an insert 23 in the form of a helix (FIG. 8) and another time with an insert 23 having a modified stairstepped design (FIG. 9). These embodiments of treat dispensers 20 also show different configurations for the open central portions of the inserts 23.

Although the insert 23 has been shown and described as a separate component, it could also be monolithic with the housing 22, for example being molded in one piece with the housing. In this connection, the housing and insert could be molded or otherwise formed together in two or more parts that are then glued, fused, welded, or otherwise connected together to form a treat dispenser.

It should be noted that the treat dispenser 20 of the present application is easy to clean. For example, a hose can be used to spray water into the housing 22 via the aperture 24 or the hole 30. In addition, if the insert 23 has an open central portion, a brush, such as a bottle brush, can be inserted therein to facilitate cleaning.

The present invention is, of course, in no way restricted to the specific disclosure of the specification and drawings, but also encompasses any modifications within the scope of the appended claims.

What I claim is:

1. A treat dispenser for animals, comprising:
a housing in the form of a chew toy for an animal and having a hollow interior, wherein said housing has at least one aperture that is open into said hollow interior and is adapted to receive and dispense treats for animals, and wherein said at least one aperture is substantially aligned with a central longitudinal axis of said insert; and
a separate component in the form of an at least partially helically extending insert disposed in said hollow interior of said housing, wherein said insert is unattached to said housing and is adapted to turn relative to and separately from said housing merely by movement of said treat dispenser to advance treats for animals to said at least one aperture of said housing,
wherein said housing has a breathing hole disposed diametrically across from said at least one aperture, and wherein said breathing hole is also open into said hollow interior of said housing and is adapted to not be able to receive or dispense treats therethrough.

2. A treat dispenser according to claim 1, wherein when viewed in a direction of a central longitudinal axis of said insert, said insert has an open central cross-section for receiving treats directly from said at least one aperture of said housing.

3. A treat dispenser according to claim 2, wherein said open central cross-section of said insert is symmetrical or asymmetrical relative to said central longitudinal axis of said insert.

4. A treat dispenser according to claim 1, wherein said at least one aperture is adapted to allow treats to pass into and out of said housing.

5. A treat dispenser according to claim 1, wherein said insert has a thread that extends in the manner of a true helix.

6. A treat dispenser according to claim 5, wherein the pitch of said thread of said insert varies from one end of said insert to another end thereof.

7. A treat dispenser according to claim 6, wherein the pitch becomes flatter in a direction towards said at least one aperture.

8. A treat dispenser according to claim 1, wherein said insert has a stairstepped design.

9. A treat dispenser according to claim 8, wherein said insert includes platform sections and sections that are inclined relative to said platform sections and that lead to or from said platform sections.

10. A treat dispenser according to claim 8, wherein said insert includes platform sections and sections that are inclined relative to said platform sections and that lead to or from some of said platform sections, and wherein some of said platform sections are interconnected by a portion that is disposed in the same plane as said platform sections that are interconnected by said last mentioned portion.

11. A treat dispenser according to claim 1, wherein said housing is made of a first material, and wherein said insert is made of a second material that is different from said first material of said housing.

12. A treat dispenser according to claim 1, wherein said insert is a flexible elastomeric material.

* * * * *